(12) United States Patent
Pao et al.

(10) Patent No.: US 10,809,827 B2
(45) Date of Patent: Oct. 20, 2020

(54) POINTING STICK MODULE AND CONTROLLER

(71) Applicant: ELAN MICROELECTRONICS CORPORATION, HsinChu (TW)

(72) Inventors: Tien-Wen Pao, Hsinchu County (TW); Pin-Jung Chung, Taoyuan (TW); Nan-Jung Liu, Hsinchu County (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 120 days.

(21) Appl. No.: 16/022,663

(22) Filed: Jun. 28, 2018

(65) Prior Publication Data
US 2019/0187815 A1    Jun. 20, 2019

(30) Foreign Application Priority Data
Dec. 18, 2017    (TW) .............................. 106144459 A

(51) Int. Cl.
  *G06F 3/0354* (2013.01)
  *G06F 3/038* (2013.01)
  *G06F 3/0338* (2013.01)
(52) U.S. Cl.
  CPC .......... *G06F 3/0383* (2013.01); *G06F 3/0338* (2013.01); *G06F 3/03545* (2013.01)
(58) Field of Classification Search
  CPC .. G06F 3/0338; G06F 3/03545; G06F 3/0383; G01R 35/007; G01L 1/20
  See application file for complete search history.

(56) References Cited

U.S. PATENT DOCUMENTS

| 6,014,900 A * | 1/2000 | Vandenboom .......... G01L 25/00 73/781 |
| 7,432,908 B2 | 10/2008 | Rutledge |
| 2002/0171629 A1* | 11/2002 | Archibald ............. G06F 3/0338 345/157 |
| 2009/0309832 A1* | 12/2009 | Zhang ................... G06F 3/0338 345/161 |
| 2010/0238226 A1* | 9/2010 | Tanaka .................. B41J 2/0458 347/17 |
| 2013/0169171 A1* | 7/2013 | Kamizono ......... H05B 33/0818 315/185 R |
| 2013/0252553 A1* | 9/2013 | Hyon .................... H04W 16/14 455/41.2 |
| 2013/0271513 A1* | 10/2013 | Park ...................... G09G 3/3406 345/691 |

(Continued)

FOREIGN PATENT DOCUMENTS

| TW | I412961 B | 10/2013 |
| TW | I460642 B | 11/2014 |

(Continued)

*Primary Examiner* — Hong Zhou
(74) *Attorney, Agent, or Firm* — Muncy, Geissler, Olds & Lowe, P.C.

(57) ABSTRACT

A pointing stick module comprising: a sensing device; a rank unit; a transmission device and a controller. The transmission device is coupled to the sensing device and the rank unit. Also, the controller is coupled to the transmission device and coupled to the rank unit via the transmission device. The controller obtains a rank signal via detecting the rank unit, and determines a rank of the sensing device according to the rank signal.

20 Claims, 7 Drawing Sheets

(56) References Cited

U.S. PATENT DOCUMENTS

| | | | | |
|---|---|---|---|---|
| 2014/0015746 A1* | 1/2014 | Hargreaves | ............. | G06F 3/016 345/157 |
| 2014/0225517 A1* | 8/2014 | Nam | ................. | H05B 33/0821 315/185 R |
| 2017/0281083 A1* | 10/2017 | Sawano | ................. | G08C 17/00 |
| 2018/0259609 A1* | 9/2018 | Huang | .................... | G01L 5/161 |

FOREIGN PATENT DOCUMENTS

| | | |
|---|---|---|
| TW | I487883 B | 6/2015 |
| TW | I588707 B | 6/2017 |

\* cited by examiner

POINTING STICK MODULE AND CONTROLLER

BACKGROUND OF THE INVENTION

1. Field of the Invention

The present invention relates to an input device. Particularly, the present invention relates to a pointing stick module can detect a rank of a sensing device to accordingly generate a sensing output, and relates to a controller can be applied to the pointing stick module.

2. Description of the Prior Art

The variable resistors of a pointing stick module can generate a sensing signal in response to a force applied to the pointing stick module. However, due to process drift, different pointing stick modules may generate different ranks of sensing signals even if the same force is applied to these pointing stick modules, thereby different pointing stick modules may have different sensing efficacies. Therefore, a creative pointing stick module is needed, to provide consistency sensing performances.

SUMMARY OF THE INVENTION

Therefore, one objective of the present invention is to provide a pointing stick module and a related controller. Thereby the pointing stick modules have consistency sensing performances.

One embodiment of the present invention discloses a pointing stick module, comprising: a sensing device; a rank unit; a transmission device, coupled to the sensing device and the rank unit; and a controller, coupled to the transmission device and coupled to the rank unit via the transmission device, wherein the controller obtains a rank signal via detecting the rank unit, and determines a rank of the sensing device according to the rank signal.

Another embodiment of the present invention discloses: a controller, configured to process a sensing signal generated by a sensing device of a pointing stick module, comprising: a power source circuit, configured to provide an electrical signal to a rank unit; and a processing circuit, configured to couple to the rank unit and to obtain a rank signal through the rank unit, and configured to generate a rank value according to the rank signal. The controller determines a rank of the sensing device according to the rank value.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Please note, the components in each embodiment can be implemented by hardware (e.g. circuit, device, and apparatus) or by firmware (e.g. a processor installed with at least one program).

The pointing stick module provided by the present invention may have a rank unit therein. The rank unit is configured to determine the rank of the sensing device of the module, such that a corresponding signal processing parameter can be determined. Further explanation is as follows.

Figure 1:
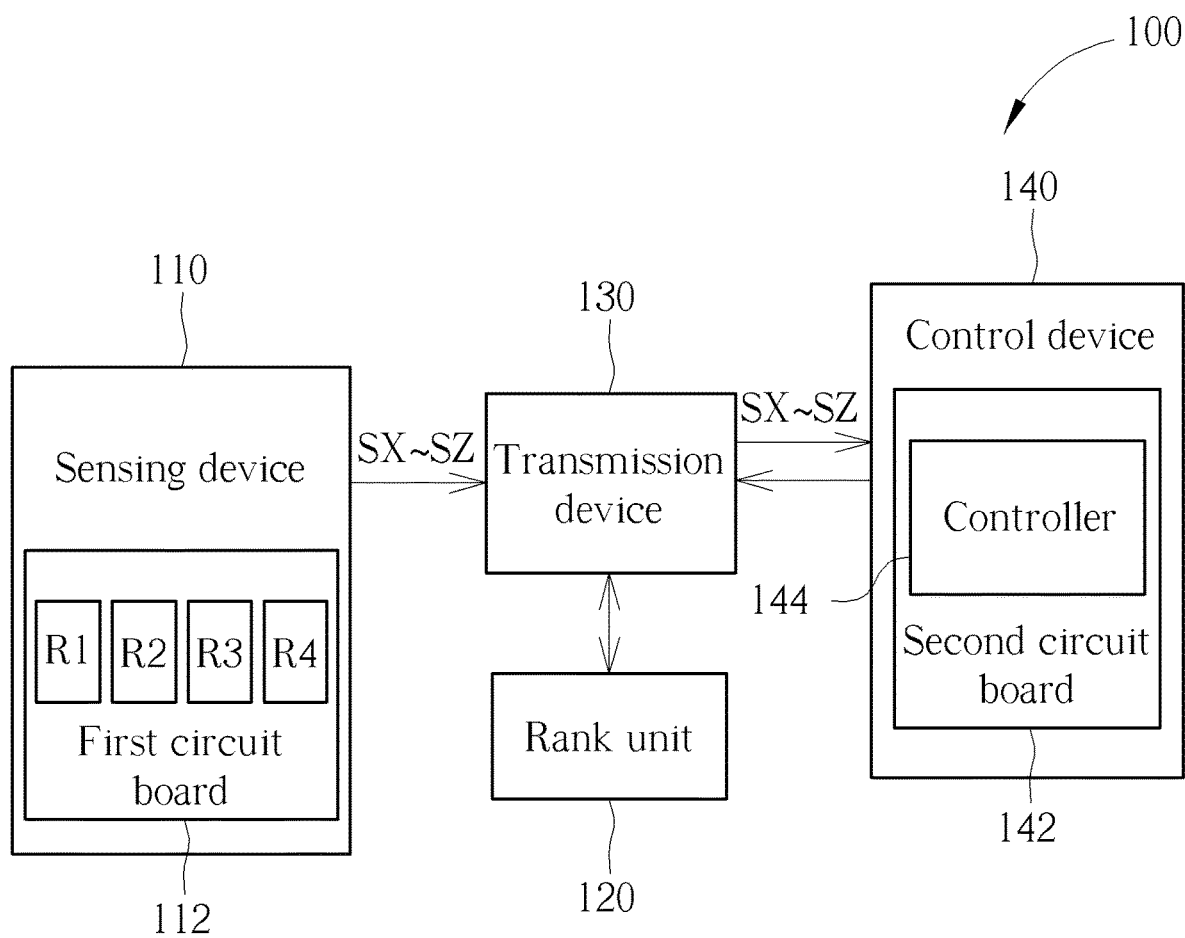
FIG. 1 is a functional block diagram of the present invention.

Please refer to FIG. 1, which is a functional block diagram of the present invention. The pointing stick module 100 may include, but is not limited to, a sensing device 110, a rank unit 120, a transmission device 130, and a control device 140. The combination of the sensing device 110, the transmission device 130 and the rank unit 120 may be regarded as a sensing module. In this embodiment, the sensing device 110 may be implemented by a pointing stick sensor (PST sensor). The sensing device 100 includes a first circuit board 112, a stick (not shown in the figure), and a plurality of variable resistors R1-R4. The stick and the variable resistors R1-R4 are disposed on the same surface or different surfaces of the first circuit board 112. When an external force is applied to the stick of the sensing device 110, the resistance values of the variable resistors R1-R4 may change accordingly, thereby generating a plurality of sensing signals SX, SY, and SZ. The structure and operation of the PST sensor are familiar to those skilled in the art, thus are omitted for brevity here.

The rank unit 120 is coupled to the transmission device 130. The rank unit 120 may be disposed in or on the transmission device 130 or the sensing device 110. The rank unit 120 is applied to indicate the rank of the sensing device 110 and may be implemented by any passive component or active component. In one embodiment, the sensing device 110 can be classified to three ranks. For example, the first rank corresponds to a range of 3.653-4.316 mV, the second rank corresponds to a range of 4.316-4.661 mV, and the third rank corresponds to a range of 4.661-5.034 mV. In a testing process, the stick of the sensing device 110 is applied with a predetermined force to obtain a sensing signal, and the sensing signal subtracts a reference value to obtain a variation, for example, 3.8 my. The amount of variation (3.8 mV) falls in the range of the first rank, as a result, the sensing device 110 is classified as the first rank. There may be many different methods for determining the ranks of the sensing device 110 and it is not limited to the above examples. If the rank of the sensing device 110 is classified as the first rank, the pointing stick module 100 adopts the rank unit 120 having a first electrical characteristic, such as a first impedance value. Also, if the rank of the sensing device 110 is classified as the second rank, the pointing stick module 100 adopts a rank unit 120 having a second electrical characteristic, such as a second impedance value, and so on.

The transmission device 130 is coupled to the sensing device 110 and the rank unit 120. The transmission device 130 may be implemented by a flexible circuit board, wherein the transmission device 130 may provide multiple signal transmission paths to transmit the plurality of sensing signals SX, SY, and SZ to the control device 140.

The control device 140 is coupled to the transmission device 130 to receive the sensing signals SX, SY, and SZ. The control device 140 includes a second circuit board 142 and a controller 144. The controller 144 is mounted on the second circuit board 142. The controller 144 is coupled to the transmission device 130 via the wires of the second circuit board 142, and is coupled to the rank unit 120 via the transmission device 130. The controller 144 obtains a rank signal by detecting the rank unit 120. For example, the controller 144 may provide an electrical signal to the rank unit 120 via the transmission device 130 to obtain the rank signal. The controller 144 generates a rank value according to the rank signal, and determines the rank of the sensing device 110 according to the rank value, to process the sensing signals SX, SY, and SZ.

In one embodiment, the controller 144 applies a signal processing procedure to process the sensing signals SX, SY, and SZ to obtain output values in the X direction, the Y direction, and the Z direction, respectively. These output values may be, for example, applied to determine a direction and a distance for movement of a cursor. The signal processing procedure includes the firmware operation of the controller 144 and the operations of an analog circuit and a digital circuit. Further, the signal processing procedure applies a compensation parameter. The compensation parameter may be, for example, a gain value of an analog to digital converter, a compensation value of a firmware operation, or other parameters applied in the signal processing procedure. In one embodiment, the compensation parameter is a gain value of the analog to digital converter, and the gain value will affect a magnitude of the digital signal output by the analog to digital converter. The larger the gain value is, the larger the digital signal output by the analog to digital converter is. In another embodiment, the compensation parameter is a compensation value. For example, the signal processing procedure includes at least one step for processing a sensing signal (such as the sensing signals SX, SY, and SZ) to obtain an initial value, and then the initial value is calculated (e.g., multiplied or added) with the compensation value to obtain the output value. The larger the compensation value is, the larger the output value obtained is.

The above-mentioned rank of the sensing device 110 can be regarded as a capability of generating a sensing signal. Corresponding to different ranks of sensing devices 110, the controller 144 selects different compensation parameters. For example, if a sensing device 110 generates sensing signals SX, SY, and SZ with smaller magnitudes corresponding to a predetermined force, the controller 144 according to the present invention may select a larger gain or a larger compensation parameter to process these sensing signals SX, SY, and SZ. If a sensing device 110 generates sensing signals SX, SY, and SZ with too large magnitudes corresponding to a predetermined force, the controller 144 according to the present invention may select a smaller gain value or a negative compensation parameter to process these sensing signals SX, SY and SZ.

The controller 144 according to the present invention can select the compensation parameter for the signal processing procedure according to the rank signal, such that when the same force is applied to different ranks of sensing devices 110, the output values obtained are substantially identical. Accordingly, according to the present invention, the pointing stick module 100 may have more consistent performance. Since the pointing stick module 100/controller 144 can use the same firmware to process the sensing signals of different ranks of sensing devices 110, there is no need to apply different controllers 144 for different ranks of sensing devices 110, thereby the complexity of materials management is reduced.

The following descriptions describe a plurality of embodiments for the pointing stick module provided by the present invention, but does not mean to limit the scope of the present invention. In following embodiments, the rank unit 120 is implemented by at least one resistor or at least one capacitor, and the rank unit 120 has a resistance value or a capacitance value corresponding to the rank of the sensing device 110.

Figure 2:
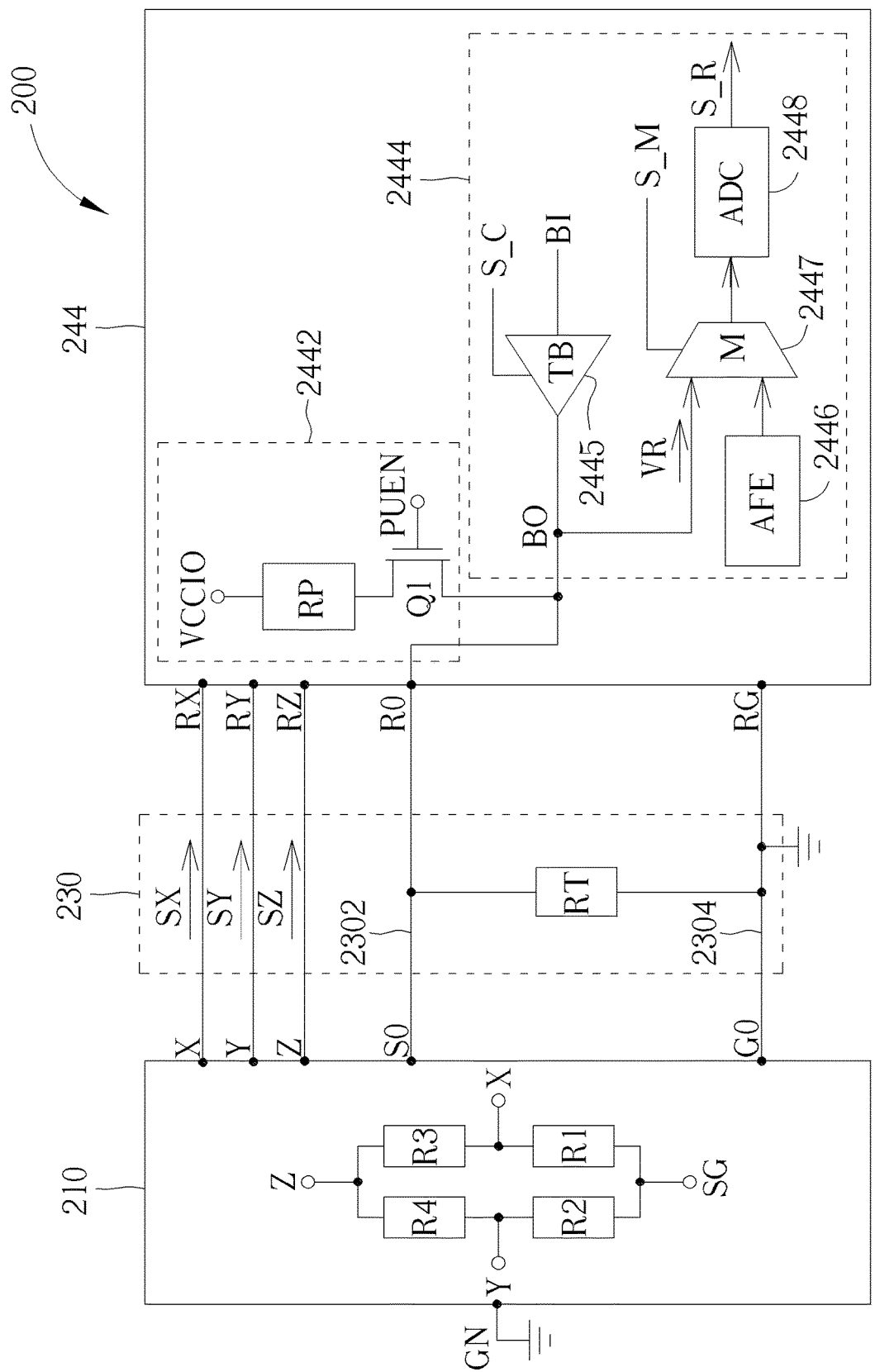
FIG. 2 is a first embodiment of the present invention.

First, please refer to FIG. 2, which is a first embodiment of a pointing stick module according to the present invention. In this embodiment, the rank unit includes a resistor RT coupled to ground (i.e. a ground-coupled resistor). As shown in the drawing, the pointing stick module 200 may include (but is not limited to) a sensing device 210, a resistor RT, a transmission device 230, and a controller 244. For the convenience of explaining, FIG. 2 omits the first circuit board 112 of FIG. 1.

The sensing device 210 may include a plurality of variable resistors R1-R4 and a plurality of terminals X, Y, Z, S0, G0, and GN. The variable resistors R1-R4 may constitute a Wheatstone bridge for generating a plurality of sensing signals SX, SY, and SZ. The variable resistor R1 is coupled between the terminal X and the terminal SG, and the variable resistor R2 is coupled between the terminal Y and the terminal SG. Also, the variable resistor R3 is coupled between the terminal X and the terminal Z, and the variable resistor R4 is coupled between the terminal Y and the terminal Z.

In this embodiment, the transmission device 230 may be implemented by a flexible circuit board for transmitting a plurality of sensing signals SX, SY, and SZ to a plurality of terminals RX, RY, RZ of the controller 244, respectively. The resistor RT may be disposed in or on the transmission device 230. For example, the resistor RT is coupled between the wire 2302 and the wire 2304 in the transmission device 230. The wire 2302 is applied to provide an electrical connection between a terminal R0 of the controller 244 and the resistor RT. The wire 2304 is applied to couple a terminal G0 of the device 210 to the terminal RG of the controller 244. The controller 244 provides a ground potential to the terminal G0 of the sensing device 210 via the terminal RG. Terminal G0 is coupled to the terminal GN. That is, the terminals RG, G0, and GN are all grounded.

The resistance of the resistor RT corresponds to the rank of the sensing device 210. For example (but the invention is not limited thereto), the rank of the sensing device 210 can be classified as one of the first rank, the second rank, and the third rank. If the sensing device 210 is the first rank, then the resistor RT with a first resistance value is selected. If the sensing device 210 is the second rank, the resistor RT with a second resistance value is selected. If the sensing device 210 is the third rank, the resistor RT with the third resistance is selected. The first resistance value, the second resistance value, and the third resistance value are all different.

The controller 244 may include, but is not limited to, a power source circuit 2442 and a processing circuit 2444. The power source circuit 2442 and the processing circuit 2444 are coupled to the resistor RT via the terminal R0. The power source circuit 2442 is configured to provide an electrical signal (e.g. voltage or current) to the resistor RT to obtain a rank signal from the terminal R0. In this embodiment, the rank signal represents the voltage of the terminal R0, that is, the voltage difference VR (or the division voltage of the resistor RT) between the two ends of the resistor RT. The voltage difference VR varies corresponding to a resistance value of the resistor RT. The processing circuit 2444 generates a rank value S_R according to the voltage difference VR. The controller 244 may determine the rank of the sensing device 210 according to the rank value S_R, to select a corresponding compensation parameter.

The power source circuit 2442 includes but is not limited to a transistor Q1 and a resistor RP. The transistor Q1 is connected in series with the resistor RP and is coupled between the terminal R0 and the resistor RP. The gate of the transistor Q1 receives a control signal PUEN. The resistor RP is coupled between the power source voltage VCCIO and the transistor Q1. Processing circuit 2444 includes, but is not limited to, a tri-state buffer 2445 (labeled "TB"), an analog front end circuit (labeled "AFE") 2446, a multiplexer 2447 (labeled "M"), and an analog to digital converter (labeled "ADC") 2448. The analog front end circuit 2446 is coupled to a plurality of terminals RX, RY and RZ for receiving and processing a plurality of sensing signals SX, SY and SZ. The multiplexer 2447 has an output terminal coupled to the input terminal of the analog to digital converter 2448, and has two input terminals respectively coupled to the terminal R0 and the analog front end circuit 2446.

The operations for the controller 244 to detect the resistance RT will be described below. The multiplexer 2447 couples the terminal R0 to the analog digital converter 2448 according to the selection signal S_M, and the tri-state buffer 2445 can dis-couple the output terminal BO from the input terminal BI according to the control signal S_C. The transistor Q1 is turned on according to the control signal PUEN, to provide the electrical signal to the resistor RT. The analog to digital converter 2448 performs an analog to digital conversion according to the potential of the terminal R0, that is, the voltage difference VR across the resistor RT (or the division voltage of the resistor RT) to generate the rank value S_R. The back end circuit (not shown) of the processing circuit 244 can know the rank of the sensing device 210 according to the rank value S_R. For example, when the rank value S_R is in a first value range 0-255, the sensing device 210 is determined as the first rank. Further, when the rank value S_R is in a second value range 256-511, the sensing device 210 is determined as the second rank, and so on.

After knowing the rank of the sensing device 210, the multiplexer 2447 couples the output of the analog front end circuit 2446 to the analog to digital converter 2448 according to the selection signal S_M, to perform analog to digital conversions to the sensing signals SX, SY and SZ. The transistor Q1 is turned off according to the control signal PUEN to avoid power consumption.

Please note that the above description is for illustrative purposes only and does not mean a limitation for the present invention. In another embodiment, the tri-state buffer 2445, the analog front end circuit 2446, and the multiplexer 2447 may be disposed in other circuit blocks of the controller 244. Moreover, the processing circuit 244 may include only the analog to digital converter 2448 to convert the voltage difference VR to generate the rank signal S_R.

Figure 3:
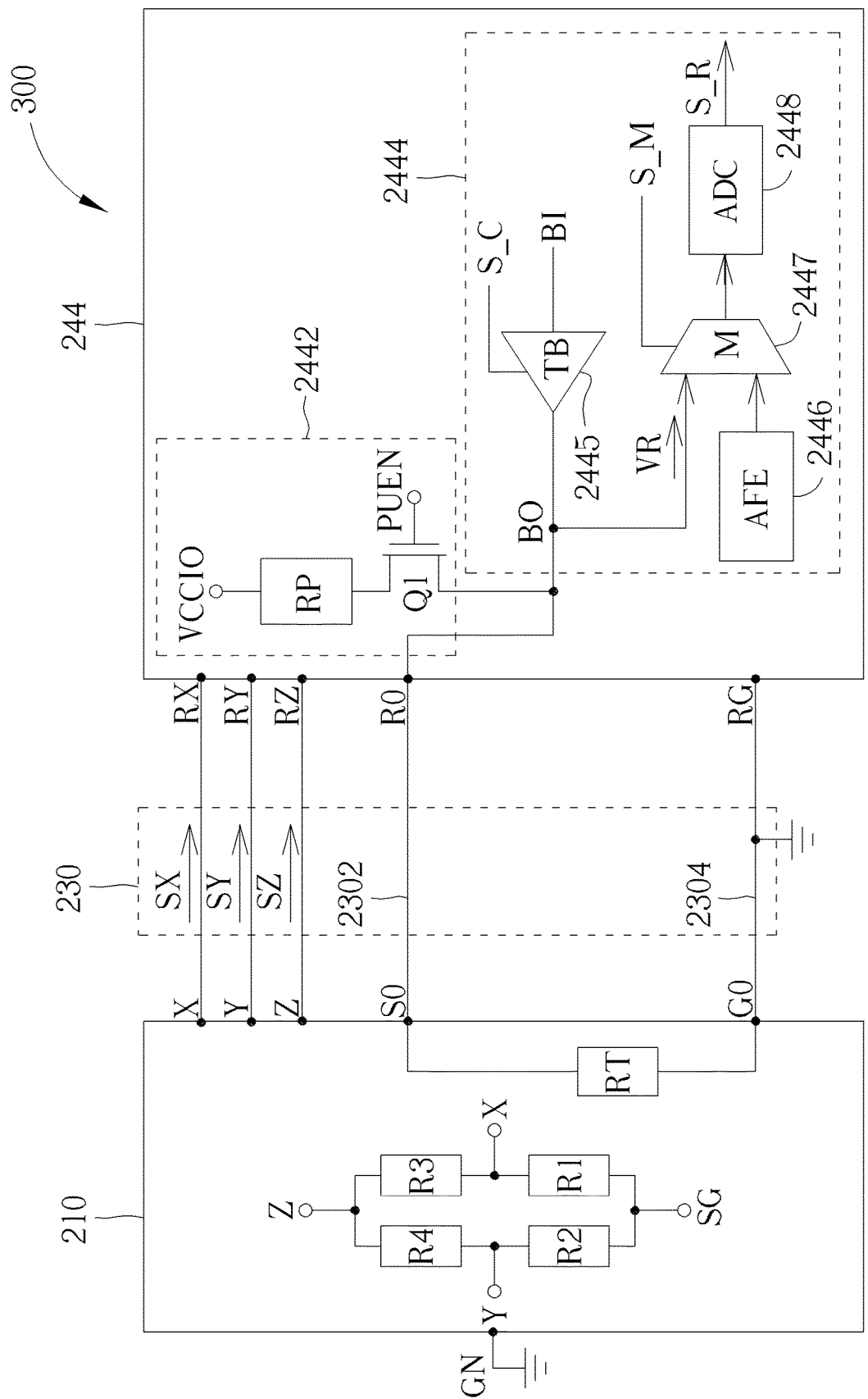
FIG. 3 is a second embodiment of the present invention.

Please refer to FIG. 3, which is a second embodiment of a pointing stick module according to the present invention. The difference between the pointing stick module 300 shown in FIG. 3 and the pointing stick module 200 shown in FIG. 2 is that the resistor RT in FIG. 3, which serves as a rank unit, is disposed in or on the sensing device 210. The resistor RT can be fabricated simultaneously with the variable resistors R1-R4, and then the conductive area of the resistor RT can be trimmed according to the rank of the sensing device 210 to adjust its resistance value.

Figure 4:
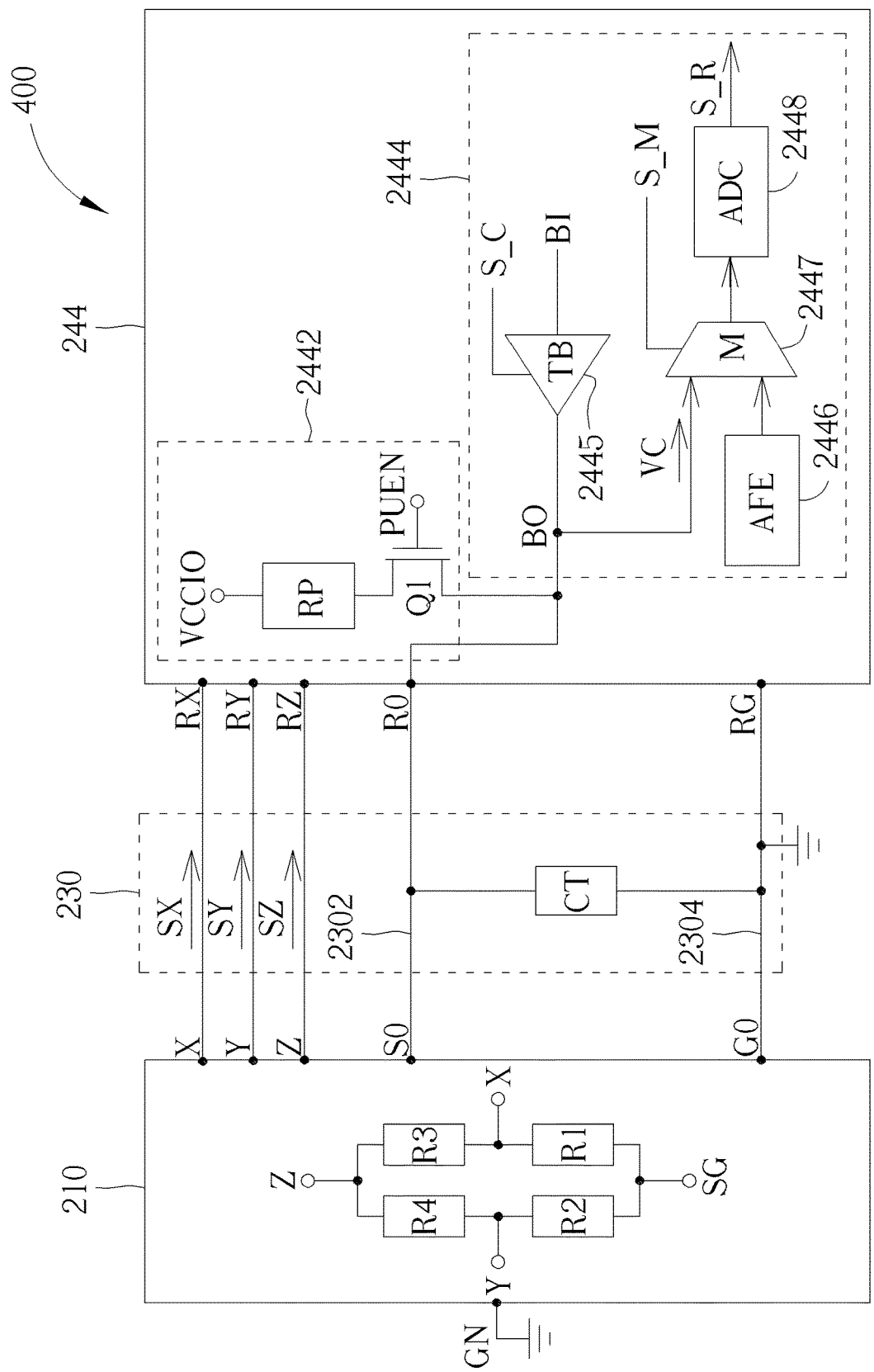
FIG. 4 is a third embodiment of the present invention.

Please refer to FIG. 4, which is a third embodiment of a pointing stick module according to the present invention. In this embodiment, the rank unit includes a capacitor CT coupled to ground. The main difference between the pointing stick module 400 shown in FIG. 4 and the pointing stick module 200 shown in FIG. 2 is that the pointing stick module 400 applies a capacitor CT, which is coupled between the wire 2302 and the wire 2304 of the transmission device 230. The capacitance value of the capacitor CT corresponds to a rank of the sensing device 210. For example, if the sensing device 210 is the first rank, the capacitor CT with a first capacitance value is selected. If the sensing device 210 is the second rank, the capacitor CT with a second capacitance value is selected. If the sensing device 210 is the third rank, then the capacitor CT with the third capacitance value is selected. The first capacitance value, the second capacitance value and the third capacitance value are all different. The power source circuit 2442 is configured to provide an electrical signal to the capacitor CT to obtain a rank signal from the terminal R0. In this embodiment, the rank signal represents a voltage of the terminal R0, that is, the voltage difference VC across the capacitor CT. (or the division voltage of the capacitor CT). The processing circuit 2444 generates a rank value S_R according to the voltage difference VC. The controller 244 may determine the rank of the sensing device 210 according to the rank value S_R to select the corresponding compensation parameter.

The operations that the controller 244 detects the capacitor CT are described as follows. The multiplexer 2447 couples the terminal R0 to the analog digital converter 2448 according to the selection signal S_M. The tri-state buffer 2445 pulls down the potential of the output terminal BO to the ground potential according to the control signal S_C, thereby the capacitor CT is discharged. Next, the tri-state buffer 2445 sets the output terminal BO to a high-impedance state according to the control signal S_C. Meanwhile, the transistor Q1 is turned on according to the control signal PUEN, to provide the electrical signal to the capacitor CT to charge the capacitor CT. After the transistor Q1 is turned on for a predetermined time (such as the time point TD shown in FIG. 5), the analog to digital converter 2448 performs analog to digital conversions according to the potential of the terminal R0 (i.e. the voltage difference VC across the capacitor CT), to generate the rank value S_R (a digital signal). A back end circuit (not shown) of the processing circuit 244 can know the rank of the sensing device 210 according to the rank value S_R.

Figure 5:
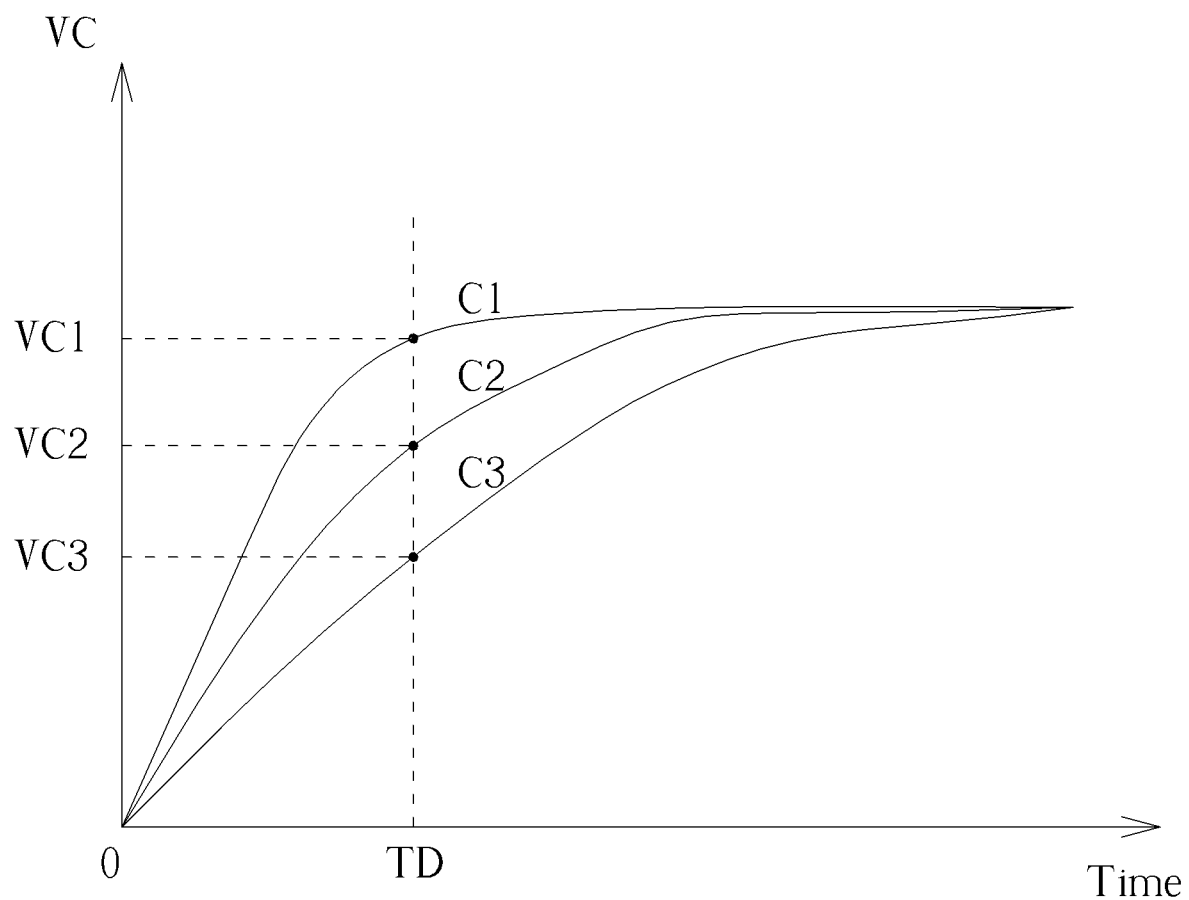
FIG. 5 illustrates the electrical potentials for different capacitors in FIG. 4, which are charged for the same charging time.

After a predetermined charging time TD (i.e. time point TD), the voltage differences generated by the capacitors CT with different capacitance values are shown in FIG. 5. In FIG. 5, the relation for capacitance values is C1<C2<C3, and the relation for the voltage differences is VC1>VC2>VC3. The smaller the capacitance value of the capacitor CT, the larger the voltage difference is. The controller 244/processing circuit 2444 can determine the rank of the sensing device 210 according to the voltage difference of the capacitor CT. Other details are similar to the above-mentioned embodiments, thus are omitted for brevity here.

Figure 6:
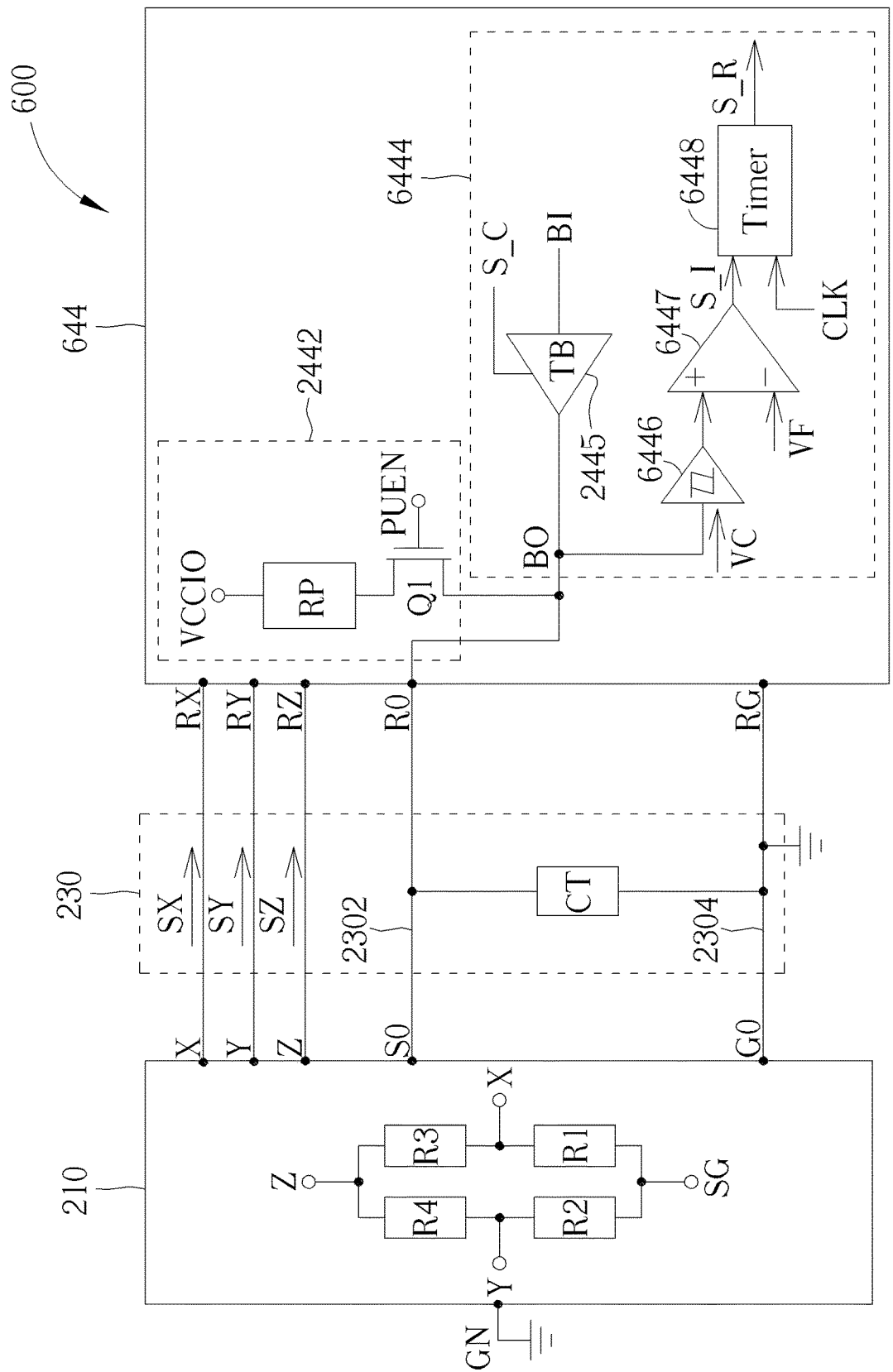
FIG. 6 is a fourth embodiment of the present invention.

Please refer to FIG. 6, which is a fourth embodiment of a pointing stick module according to the present invention. In this embodiment, the rank unit includes a capacitor CT coupled to ground. The main difference between the pointing input module 600 shown in FIG. 6 and the pointing input module 400 shown in FIG. 4 is that the control circuit 644 of the pointing stick module 600 determines a rank of the sensing device 210 based on a required time that a voltage difference VC across two ends of the capacitor CT reach a predetermined voltage value.

In FIG. 6, the controller 644 may include, but is not limited to, the power source circuit 2442 shown in FIG. 2 and a processing circuit 6444. The power source circuit 2442 and the processing circuit 6444 are coupled to the capacitor CT via the terminal R0. The power source circuit 2442 is configured to provide an electrical signal to the capacitor CT to charge the capacitor CT. The processing circuit 6444 generates a rank value S_R according to a charging time for charging the capacitor CT to a reference voltage VF.

The processing circuit 6444 includes, but is not limited to, a Schmitt trigger 6446, a comparing circuit 6447, a timer 6448, and the tri-state buffer 2445 shown in FIG. 2. The Schmitt trigger 6446 is coupled between the comparing circuit 6447 and the terminal R0, configured to detect a potential of the terminal R0, and to cause the potential of the terminal R0 to occur a hysteresis effect to avoid noise interference. The output terminal of the comparing circuit 6447 is coupled to the timer 6448. The comparing circuit 6447 has a non-inverting input terminal for receiving the output of the Schmitt trigger 6446, and has an inverting input terminal coupled to the reference voltage VF. The comparing circuit 6447 is applied to compare the voltage of the terminal R0 (i.e. the voltage difference VC of the capacitor CT) with the reference voltage VF, and to generate an indicating signal S_I when the voltage difference VC of the capacitor CT is greater than the reference voltage VF. The timer 6448 receives the clock signal CLK and starts counting when the transistor Q1 is turned on, and stops counting when receiving the indicating signal S_I. For example, the timer 6448 stops counting while the output of the comparing circuit 6447 transits from low to high. The rank value S_R output by the timer 6448 represents the time length of its counting, and is used to determine the rank of the sensing device 210 by the controller 644.

The operations that the controller 644 detects the capacitor CT will be described below. The tri-state buffer 2445 pulls down the potential of the output terminal BO to the ground potential according to the control signal S_C, to cause the capacitor CT to discharge. Next, the tri-state buffer 2445 sets the output terminal BO to a high-impedance state according to the control signal S_C, and the transistor Q1 is turned on according to the control signal PUEN, to provide the electrical signal to the capacitor CT to charge the capacitor CT, and the timer 6448 starts counting (e.g. counting according to the clock signal CLK).

When the voltage difference VC across two ends of the capacitor CT is greater than the reference voltage VF, the output of the comparing circuit 6447 transits from a low state to a high state, such that the timer 6448 stops counting. The rank value S_R output from the timer 6448 represents a charging time for charging the capacitor CT to a reference voltage VF. The controller 644/processing circuit 6444 can determine the rank of the sensing device 210 according to the charging time. For example, if the charging time is within the first time period, it is determined that the sensing device 210 is the first rank. If the charging time is within the second time period, the sensing device 210 is determined to be the second rank, and so on.

Figure 7:
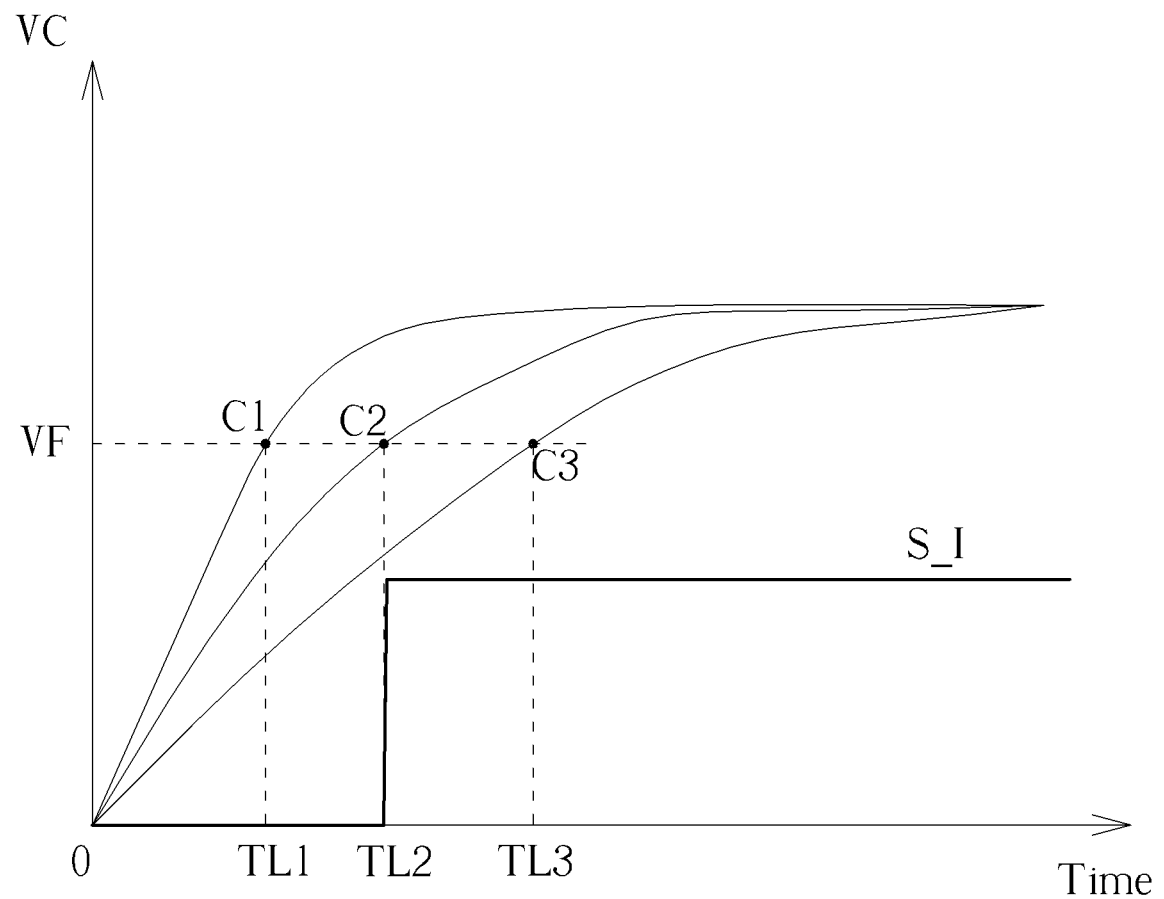
FIG. 7 illustrates the required time for charging the different capacitors in FIG. 6 to a reference voltage.

The greater the capacitance value of the capacitor CT, the slower the capacitor CT is charged to the reference voltage VF. FIG. 7 illustrates the required time for charging different capacitors CT with different capacitance values in FIG. 6 to a reference voltage. In the embodiment shown in FIG. 7, a relation for the capacitance values is C1<C2<C3, and a relation for the charging times is TL1<TL2<TL3. The greater the capacitance value of the capacitor CT is, the longer time is needed for charging the capacitor CT to the reference voltage VF. The controller 644/processing circuit 6444 can determine the rank of the sensing device 210 according to the charging time obtained by the timer 6448. Other details are similar to the previous embodiments, thus are omitted for brevity here.

In another embodiment, the processing circuit 6444 may only include the comparison circuit 6447 and the timer 6448 to calculate the charging time required for the voltage difference VC of the capacitor CT to reach the reference voltage VF. In such example, the tri-state buffer 245 and/or the Schmitt trigger 646 can be omitted.

The above-mentioned resistor RT may be a single resistor or a combination of a plurality of resistors. The above-mentioned capacitor CT may be a single capacitor or a combination of a plurality of capacitors.

Although the above-mentioned embodiments are described as a sensing device having a Wheatstone bridge composed of a plurality of variable resistors, the present invention is not limited thereto. The controller according to the present invention can be applied to any input device that needs to determine the rank of a sensing device.

From the above-mentioned embodiments, it can be found that the controller according to the present invention can detect the rank unit via only one pin (terminal R0), which not only saves the production cost, but also makes effective use of the pins of the integrated circuit package.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pointing stick module, comprising:
    a sensing device, configured to generate a sensing signal;
    a rank unit;
    a transmission device, coupled to the sensing device and the rank unit; and
    a controller, coupled to the transmission device and coupled to the rank unit via the transmission device, wherein the controller obtains a rank signal via detecting the rank unit, and determines a rank of the sensing device according to the rank signal, and wherein the rank of the sensing device indicates a capability of the sensing device that generates the sensing signal and the controller processes the sensing signal in response to the rank signal;
    wherein the rank unit comprises a resistor and the rank signal is a division voltage of the resistor, wherein the controller comprises:
        a power source circuit, configured to provide an electrical signal to the resistor; and
        a processing circuit, comprising an analog to digital converter configured to perform an analog to digital conversion to the division voltage of the resistor.

2. The pointing stick module of claim 1, wherein the rank unit is disposed in or on the sensing device or the transmission device.

3. The pointing stick module of claim 1, wherein the controller applies a signal processing procedure to process a plurality of sensing signals output by the sensing device to obtain a plurality of output values, and selects a compensating parameter for the signal processing procedure according to the rank.

4. The pointing stick module of claim 3, wherein the compensating parameter is a gain value or a compensating value.

5. The pointing stick module of claim 1, wherein the sensing device comprises a plurality of variable resistors, wherein the variable resistors constitutes a Wheatstone bridge.

6. The pointing stick module of claim 1, A pointing stick module, comprising:
a sensing device, configured to generate a sensing signal;
a rank unit;
a transmission device, coupled to the sensing device and the rank unit; and
a controller, coupled to the transmission device and coupled to the rank unit via the transmission device, wherein the controller obtains a rank signal via detecting the rank unit, and determines a rank of the sensing device according to the rank signal, and wherein the rank of the sensing device indicates a capability of the sensing device that generates the sensing signal and the controller processes the sensing signal in response to the rank signal;
wherein the rank unit comprises a capacitor and the rank signal is a voltage of the capacitor, wherein the controller comprises:
a power source circuit, configured to charge the capacitor; and
a processing circuit, comprising an analog to digital converter configured to perform an analog to digital conversion to the voltage of the capacitor after the power source circuit charges the capacitor for a predetermined time.

7. The pointing stick module of claim 6, wherein the controller applies a signal processing procedure to process a plurality of sensing signals output by the sensing device to obtain a plurality of output values, and selects a compensating parameter for the signal processing procedure according to the rank.

8. The pointing stick module of claim 7, wherein the compensating parameter is a gain value or a compensating value.

9. The pointing stick module of claim 6, wherein the sensing device comprises a plurality of variable resistors, wherein the variable resistors constitutes a Wheatstone bridge.

10. A pointing stick module, comprising:
a sensing device, configured to generate a sensing signal;
a rank unit;
a transmission device, coupled to the sensing device and the rank unit; and
a controller, coupled to the transmission device and coupled to the rank unit via the transmission device, wherein the controller obtains a rank signal via detecting the rank unit, and determines a rank of the sensing device according to the rank signal, and wherein the rank of the sensing device indicates a capability of the sensing device that generates the sensing signal and the controller processes the sensing signal in response to the rank signal;
wherein the rank unit comprises a capacitor coupled to ground and the rank signal is a voltage of the capacitor, wherein the controller comprises:
a power source circuit, configured to charge the capacitor; and
a processing circuit, configured to count a charging time for charging the capacitor to a reference voltage.

11. The pointing stick module of claim 10, wherein the processing circuit comprises:
a comparing circuit, configured to compare the voltage of the capacitor with the reference voltage, and configured to generate an indicating signal while the voltage of the capacitor is larger than the reference voltage; and
a timer, coupled to the comparing circuit, wherein the timer starts to count while the power source circuit starts to charge the capacitor, and stops counting while receiving the indicating signal, to obtain the charging time.

12. The pointing stick module of claim 10, wherein the controller applies a signal processing procedure to process a plurality of sensing signals output by the sensing device to obtain a plurality of output values, and selects a compensating parameter for the signal processing procedure according to the rank.

13. The pointing stick module of claim 12, wherein the compensating parameter is a gain value or a compensating value.

14. The pointing stick module of claim 10, wherein the sensing device comprises a plurality of variable resistors, wherein the variable resistors constitutes a Wheatstone bridge.

15. A controller, configured to process a sensing signal generated by a sensing device of a pointing stick module, comprising:
a power source circuit, configured to provide an electrical signal to a rank unit; and
a processing circuit, configured to couple to the rank unit and to obtain a rank signal through the rank unit, and configured to generate a rank value according to the rank signal;
wherein the controller determines a rank of the sensing device according to the rank value and processes the sensing signal in response to the rank signal; and
wherein the rank of the sensing device indicates a capability of the sensing device that generates the sensing signal;
wherein the processing circuit comprises an analog to digital converter configured to perform an analog to digital conversion to the rank signal, to generate the rank value.

16. The controller of claim 15, wherein the controller applies a signal processing procedure to process the sensing signal to obtain an output value, and selects a compensating parameter for the signal processing procedure according to the rank value.

17. The controller of claim 16, wherein the compensating parameter is a gain value or a compensating value.

18. A controller, configured to process a sensing signal generated by a sensing device of a pointing stick module, comprising:
a power source circuit, configured to provide an electrical signal to a rank unit; and
a processing circuit, configured to couple to the rank unit and to obtain a rank signal through the rank unit, and configured to generate a rank value according to the rank signal;
wherein the controller determines a rank of the sensing device according to the rank value and processes the sensing signal in response to the rank signal; and
wherein the rank of the sensing device indicates a capability of the sensing device that generates the sensing signal;

wherein the processing circuit comprises a timer, configured to count a time that the rank signal reaches a predetermined voltage.

19. The controller of claim 18, wherein the controller applies a signal processing procedure to process the sensing signal to obtain an output value, and selects a compensating parameter for the signal processing procedure according to the rank value.

20. The controller of claim 19, wherein the compensating parameter is a gain value or a compensating value.

* * * * *